United States Patent
Myong et al.

(10) Patent No.: US 8,787,514 B2
(45) Date of Patent: Jul. 22, 2014

(54) APPARATUS AND METHOD FOR GENERATING PSEUDO NOISE CODE

(75) Inventors: Seung Il Myong, Daejeon (KR); Jong Sub Cha, Daejeon (KR); Sang Hyun Mo, Daejeon (KR); Jae Heum Lee, Daejeon (KR); Heyung Sub Lee, Daejeon (KR); Jong Suk Chae, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 170 days.

(21) Appl. No.: 13/003,374

(22) PCT Filed: Dec. 31, 2008

(86) PCT No.: PCT/KR2008/007817
§ 371 (c)(1),
(2), (4) Date: Jan. 10, 2011

(87) PCT Pub. No.: WO2010/021438
PCT Pub. Date: Feb. 25, 2010

(65) Prior Publication Data
US 2011/0122926 A1    May 26, 2011

(30) Foreign Application Priority Data
Aug. 22, 2008  (KR) .......................... 10-2008-0082236

(51) Int. Cl.
*H04L 27/10* (2006.01)
(52) U.S. Cl.
USPC ............................ 375/372; 327/141; 370/503

(58) Field of Classification Search
USPC ................................................. 375/372, 367
See application file for complete search history.

(56) References Cited

U.S. PATENT DOCUMENTS

| 4,635,274 | A  | * | 1/1987 | Kubota et al. ................. 375/141 |
| 5,303,258 | A  | * | 4/1994 | Nakamura ..................... 375/142 |
| 5,410,570 | A  | * | 4/1995 | Ladha et al. ................... 375/367 |
| 5,444,781 | A  | * | 8/1995 | Lynn et al. ..................... 380/46 |
| 5,519,736 | A  | * | 5/1996 | Ishida ............................ 375/367 |
| 6,687,319 | B1 | * | 2/2004 | Perino et al. .................. 375/367 |

(Continued)

FOREIGN PATENT DOCUMENTS

| KR | 1998-085648 | 12/1998 |
| KR | 1999-000778 | 1/1999 |

(Continued)

OTHER PUBLICATIONS

R. N. Mutagi, "Pseudo noise sequences for engineers", IEE Electronics & Communication Engineering Journal, vol. 8, Issue 2, Apr. 1996, pp. 79-87.

(Continued)

*Primary Examiner* — Santiago Garcia
(74) *Attorney, Agent, or Firm* — Staas & Halsey LLP

(57) ABSTRACT

An apparatus and method of generating a pseudo noise (PN) code is provided. The apparatus for generating the PN code includes: a memory device unit including a plurality of memory devices; an exclusive-OR (XOR) operation unit receiving output values of at least two memory devices among output values of the plurality of memory devices to output an XOR operation value with respect to the received output values; and a PN code generation unit generating the PN code based on an output value of the XOR operation unit.

3 Claims, 7 Drawing Sheets

(56) References Cited

U.S. PATENT DOCUMENTS

| | | | |
|---|---|---|---|
| 6,687,376 B1* | 2/2004 | Yamaguchi | 380/46 |
| 7,065,127 B2* | 6/2006 | Keller et al. | 375/140 |
| 7,089,274 B2 | 8/2006 | Smeets | |
| 7,479,909 B2* | 1/2009 | Dias | 341/131 |
| 7,804,912 B2* | 9/2010 | Luz et al. | 375/269 |
| 7,830,949 B2* | 11/2010 | Mehrnia et al. | 375/142 |
| 2005/0190818 A1* | 9/2005 | Sunaga et al. | 375/130 |
| 2005/0271119 A1* | 12/2005 | Dias | 375/130 |
| 2008/0192867 A1* | 8/2008 | Mehrnia et al. | 375/343 |
| 2009/0135053 A1* | 5/2009 | Negoro et al. | 342/195 |
| 2011/0093635 A1* | 4/2011 | Matsumoto et al. | 710/110 |

FOREIGN PATENT DOCUMENTS

| | | |
|---|---|---|
| KR | 1020010091164 A1 | 10/2001 |
| KR | 10-2007-0007687 | 1/2007 |
| KR | 10-2008-0022236 | 3/2008 |
| KR | 10-2008-0063500 | 7/2008 |

OTHER PUBLICATIONS

J. F. Beaumont, "RTL Design of a Generic Pseudonoise Generator", Defence Research and Development Canada, Sep. 2004.

International Search Report for PCT/KR2008/007817, mailed Apr. 30, 2009.

* cited by examiner

APPARATUS AND METHOD FOR GENERATING PSEUDO NOISE CODE

CROSS REFERENCE TO RELATED APPLICATIONS

This application claims the benefit under 35 U.S.C. Section 371, of PCT International Application No. PCT/KR2008/007817, filed Dec. 31, 2008, which claimed priority to Korean Application No. 10-2008-0082236, filed Aug. 22, 2008, the disclosures of which are hereby incorporated by reference.

TECHNICAL FIELD

The present invention relates to an apparatus and method of generating a pseudo noise (PN) code, and more particularly, to an apparatus that can generate a PN code with an enhanced bit error rate (BER) performance.

This work was supported by the IT R&D program of MIC/IITA. [2008-5-040-01, Development of real-time locating systems]

BACKGROUND ART

A Direct Sequence Spread Spectrum (DSSS) is a spread spectrum technique that spreads the original data signal into a certain sequence to thereby perform communication. The DSSS has been widely used in radio frequency (RF) communication systems.

FIG. 1 is a block diagram illustrating a configuration of a DSSS demodulator 100 according to a conventional art.

The DSSS demodulator 100 includes an analog-to-digital (A/D) converter 110, a decimator 120, a correlator 130, a deframer 140, a pseudo noise (PN) code generation unit 150, and a cyclic redundancy check (CRC) checker 160.

The A/D converter 110 may receive an analog signal from an outside and convert it to a digital signal. The decimator 120 may receive the converted digital signal and determine a decision point among the eight times over-sampled data. The correlator 130 may correlate between the determined signal and a PN code from the PN code generation unit 150 to thereby compare correlation property. When a correlation value is greater than or equal to a predetermined threshold, the deframer 140 may cancel a PN code that is added in a received signal to thereby deframe an original signal. The CRC checker 160 may perform CRC in order to determine whether the deframed original signal is normal.

In the DSSS modulating/demodulating process, a PN code with an excellent correlation property may need to be used in order to accurately demodulate the original signal. Therefore, there is a need for an apparatus that can generate the PN code with the excellent correlation property.

DISCLOSURE OF INVENTION

Technical Goals

An aspect of the present invention provides an apparatus and method for generating a pseudo noise (PN) code that can have an excellent discrimination and satisfy a run property, and a shift and add property.

Technical Solutions

According to an aspect of the present invention, there is provided an apparatus for generating a pseudo noise (PN) code, the apparatus including: a memory device unit including a plurality of memory devices; an exclusive-OR (XOR) operation unit receiving output values of at least two memory devices among output values of the plurality of memory devices to output an XOR operation value with respect to the received output values; and a PN code generation unit generating the PN code based on an output value of the XOR operation unit.

According to another aspect of the present invention, there is provided a method of generating a PN code, the method including: receiving a clock signal; extracting at least two bit values from bit values that are output from a plurality of memory devices in correspondence to the clock signal; outputting an XOR operation value with respect to the extracted at least two bit values; and generating the PN code based on the output XOR operation value.

BEST MODE FOR CARRYING OUT THE INVENTION

Figure 1:
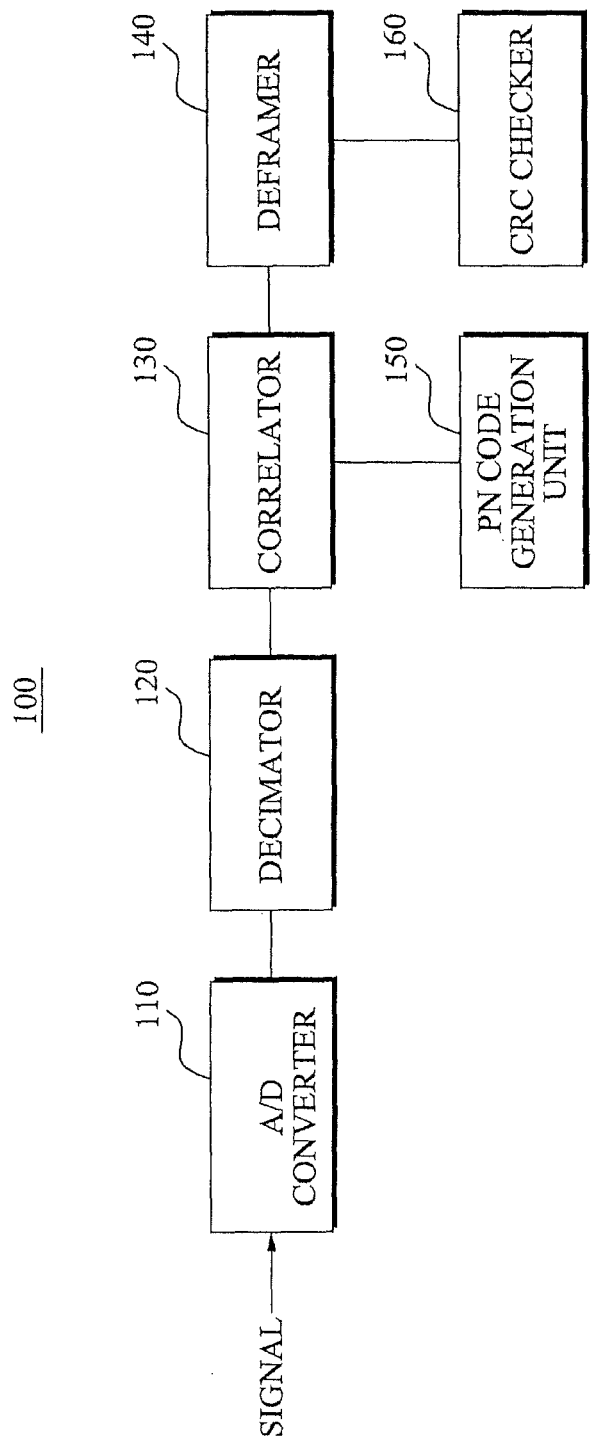
FIG. 1 is a block diagram illustrating a configuration of a Direct Sequence Spread Spectrum (DSSS) demodulator according to a conventional art.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
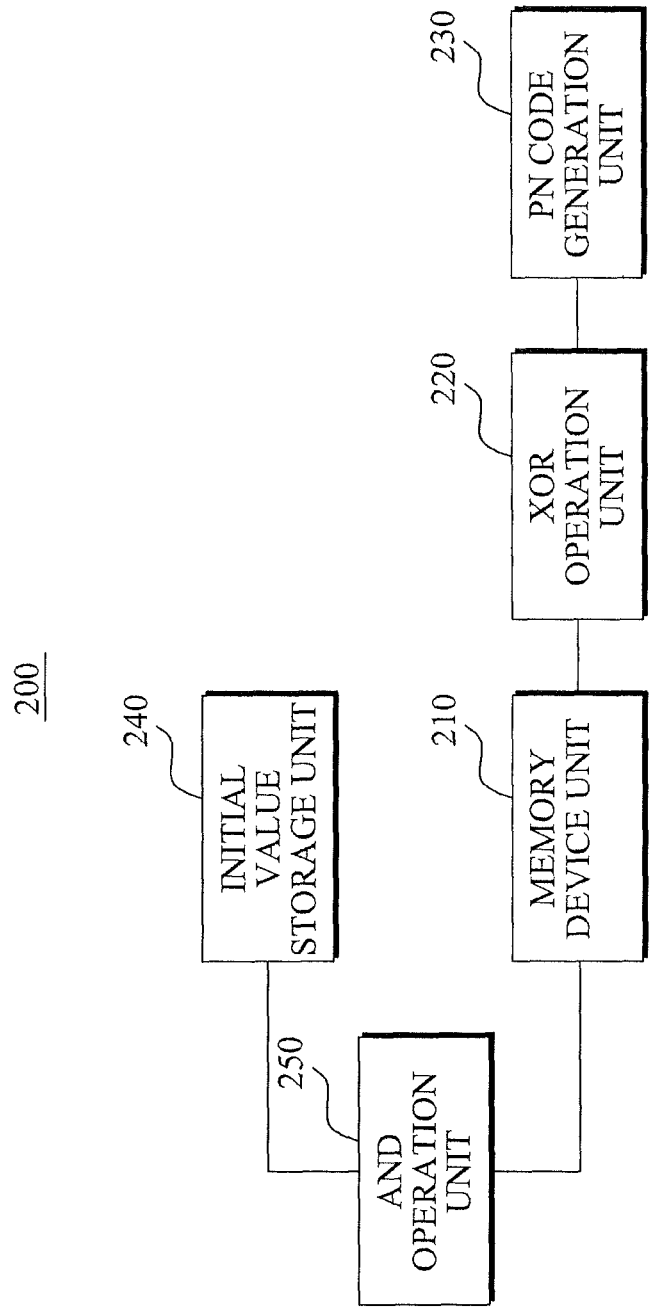
FIG. 2 is a block diagram illustrating a configuration of an apparatus for generating a pseudo noise (PN) code according to an embodiment of the present invention.

FIG. 2 is a block diagram illustrating a configuration of an apparatus 200 for generating a pseudo noise (PN) code according to an embodiment of the present invention.

The PN code generating apparatus 200 includes a memory device unit 210, an exclusive-OR (XOR) operation unit 220, and a PN code generation unit 230. In this instance, according to an aspect of the present invention, the PN code generating apparatus 200 may further include an initial value storage unit 240 and an AND operation unit 250. Also, the PN code generating apparatus 200 may further include a clock signal generation unit (not shown). Hereinafter, a function of each of constituent elements will be described in detail.

The memory device unit 210 may include a plurality of memory devices.

The plurality of memory devices included in the memory device unit 210 may receive a particular bit value to output the received bit value after a predetermined period of time is elapsed.

The PN code may be generated using a feedback shift register. Each of the plurality of memory devices included in the memory device unit 210 may correspond to a memory device included in the feedback shift register. According to an aspect of the present invention, the plurality of memory devices may be cascaded.

Also, according to an aspect of the present invention, the memory device may correspond to a flip flop.

The flip flop denotes a circuit that can store and maintain a single bit of information and is a basic constituent element of a sequential circuit. Also, the flip flop may be any one of basic circuits that constitute a main memory unit, a central processing unit (CPU) cache, and a register of a computer. According to an aspect, the memory device may correspond to a D-flip flop.

The XOR operation unit 220 may receive output values of at least two memory devices among output values of the plurality of memory devices to output an XOR operation value with respect to the received output values.

A conventional PN code generating apparatus may generate the PN code by selecting particular output values from output values of the plurality of memory devices, outputting an AND operation value with respect to a portion of the selected particular output values, and performing an XOR operation with respect to the AND operation value and remaining output values excluding the portion of the selected particular output values. In this case, due to a non-linear property of the PN code generating apparatus, the generated PN code may not have the run property, and the shift and add property corresponding to unique properties of the PN code.

Accordingly, in order to generate a PN code that can have an excellent discrimination and satisfy the run property, and the shift and add property, the PN code generating apparatus 200 may select particular output values from output values of the plurality of memory devices and gradually perform the XOR operation with respect to the entire selected particular output values.

The PN code generation unit 230 may generate the PN code based on the output value of the XOR operation unit 220.

According to an aspect of the present invention, the PN code generating apparatus 200 may further include a clock signal generation unit (not shown). In this case, the XOR operation unit 220 may output the XOR operation value for each clock period, based on the generated clock signal. The PN code generation unit 220 may sequentially arrange the XOR operation value output for each clock period to thereby generate the PN code. Specifically, the PN code generation unit 230 may sequentially arrange the output XOR operation values to thereby generate the PN code.

Also, according to an aspect of the present invention, the PN code generating apparatus 200 may further include the initial value storage unit 240 and the AND operation unit 250. In this instance, the plurality of memory devices may be cascaded.

The initial value storage unit 240 may store an initial value of each of the memory devices.

The AND operation unit 250 may output an AND operation value with respect to the initial value of each of the memory devices and an output value of a memory device that is positioned in a final end among the plurality of cascaded memory devices.

Specifically, the AND operation unit 250 may output the AND operation value with respect to the initial value of each of the memory devices and a feedback value of the memory device of the final end.

In this case, according to an aspect of the present invention, a memory device that is positioned in a front end among the plurality of cascaded memory devices may receive an output value of the AND operation unit 250 with respect to an initial value of the memory device of the front end. Each of memory devices excluding the memory device of the front end may receive an XOR operation value with respect to an output value of the AND operation unit 250 associated with the initial value of each of the memory devices and an output value of a memory device that is disposed in front of each corresponding memory device.

Specifically, the plurality of memory devices may be cascaded to thereby form the structure of a feedback shift register. In this case, the memory devices excluding the memory device of the front end may receive the XOR operation value with respect to the output value of the memory device that is disposed in the front of each corresponding memory device and the output value of the AND operation unit 250. This is in order to reflect an initial value of a memory device.

According to an aspect of the present invention, the memory device unit 210 may include nine memory devices. The AND operation unit 250 may include nine AND gates. This corresponds to the structure of a PN code generating apparatus that is included in a Radio Frequency Identification (RFID) transceiver according to International Standardization Organization (ISO)/International Electrotechnical Commission (IEC) 24730-2 or 18185-5 type B.

In this instance, the XOR operation unit 220 may receive the output values of the at least two memory devices based on a PN code generation polynomial expression. According to an aspect of the present invention, the PN code generation polynomial expression may be given by, $$G(x)=x^9+x^8+x^7+x^6+x^3+x+1 \qquad \text{[Equation 1]}$$

where G(x) denotes the PN code generation polynomial expression, and each item that is expressed as an exponentiation of x in the PN code generation polynomial expression denotes a location of each cascaded memory device. This follows the structure of the PN code generating apparatus included in the RFID transceiver according to ISO/IEC 24730-2 or 18185-5 type B.

Figure 3:
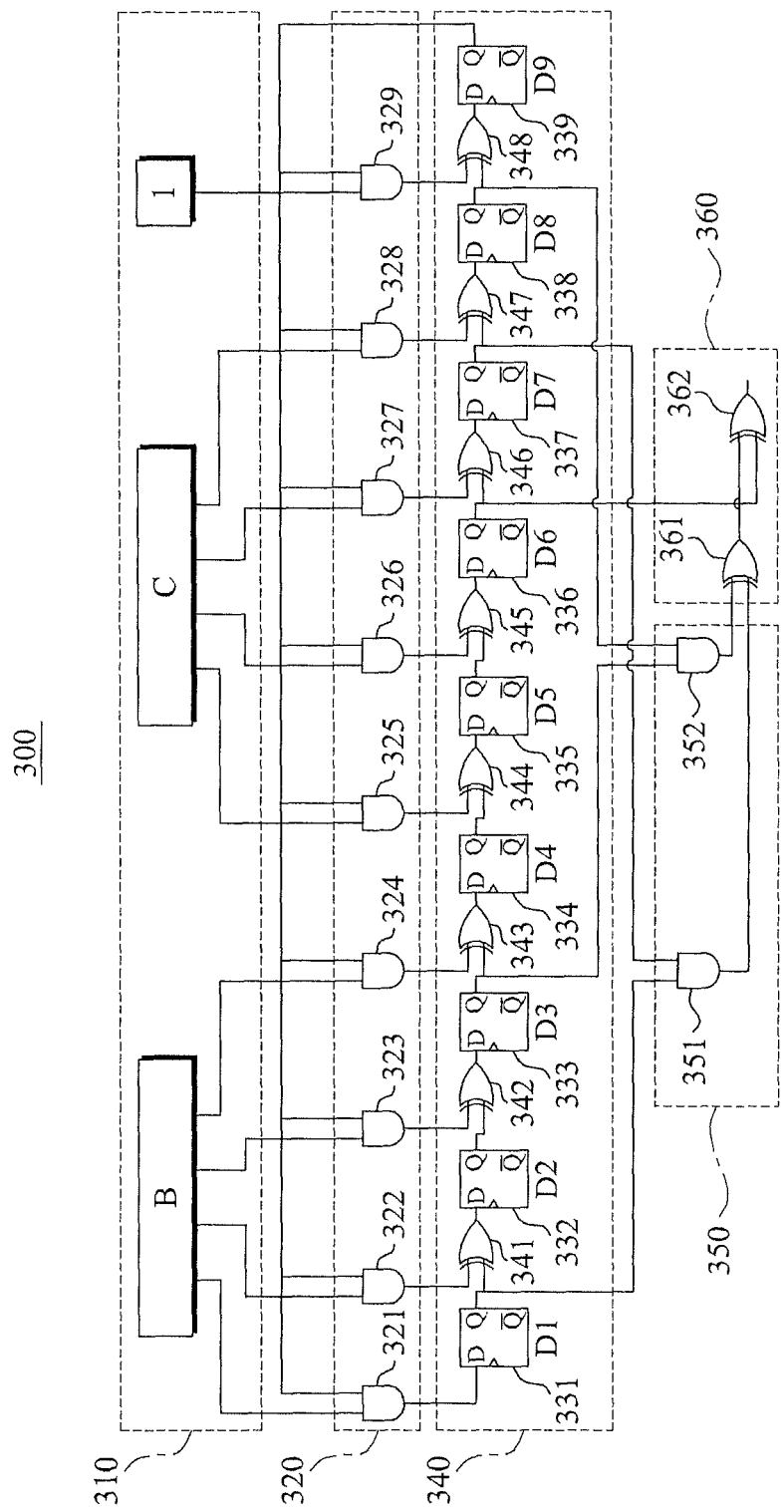
FIG. 3 illustrates a structure of a conventional PN code generating apparatus.

FIG. 3 illustrates the structure of a conventional PN code generating apparatus 300.

The PN code generating apparatus 300 may be a PN code generating apparatus that is included in an RFID transceiver according to ISO/IEC 24730-2 or 18185-5 type B.

The PN code generating apparatus 300 may include an initial storage unit 310, an adder unit 320, a bit shifter unit 340, an AND operation unit 350, and an XOR operation unit 360. The adder unit 320 may include nine AND gates 321, 322, 323, 324, 325, 326, 327, 328, and 329. The bit shifter unit 340 may include nine D-flip flops (D1, D2, D3, D4, D5, D6, D7, D8, and D9) 331, 332, 333, 334, 335, 336, 337, 338, and 339, and eight XOR gates 341, 342, 343, 344, 345, 346, 347, and 348. The AND operation unit 350 may include two AND gates 351 and 352. The XOR operation unit 360 may include two XOR gates 361 and 362.

The initial value storage unit 310 may store an initial value of each of the D-flip flops 331 through 339. B, C, and 1 of FIG. 3 denote hexadecimal number.

The AND gate 351 may perform AND operation for output values of the D-flip flops 331 and 337. The AND gate 352 may perform AND operation for output values of the D-flip flops 333 and 338. The XOR gate 361 may perform XOR operation for each of output values of the AND gates 351 and 352. XOR operation may be performed for the output value of the XOR gate 361 and the output value of the D-flip flop 336 to thereby generate a single bit constituting the PN code.

Due to the AND operation of the AND operation unit 350, the PN code generating apparatus 300 may have a non-linear property. Therefore, the PN code generated by the PN code generating apparatus 300 may not satisfy the run property, and the shift and add property.

Figure 4:
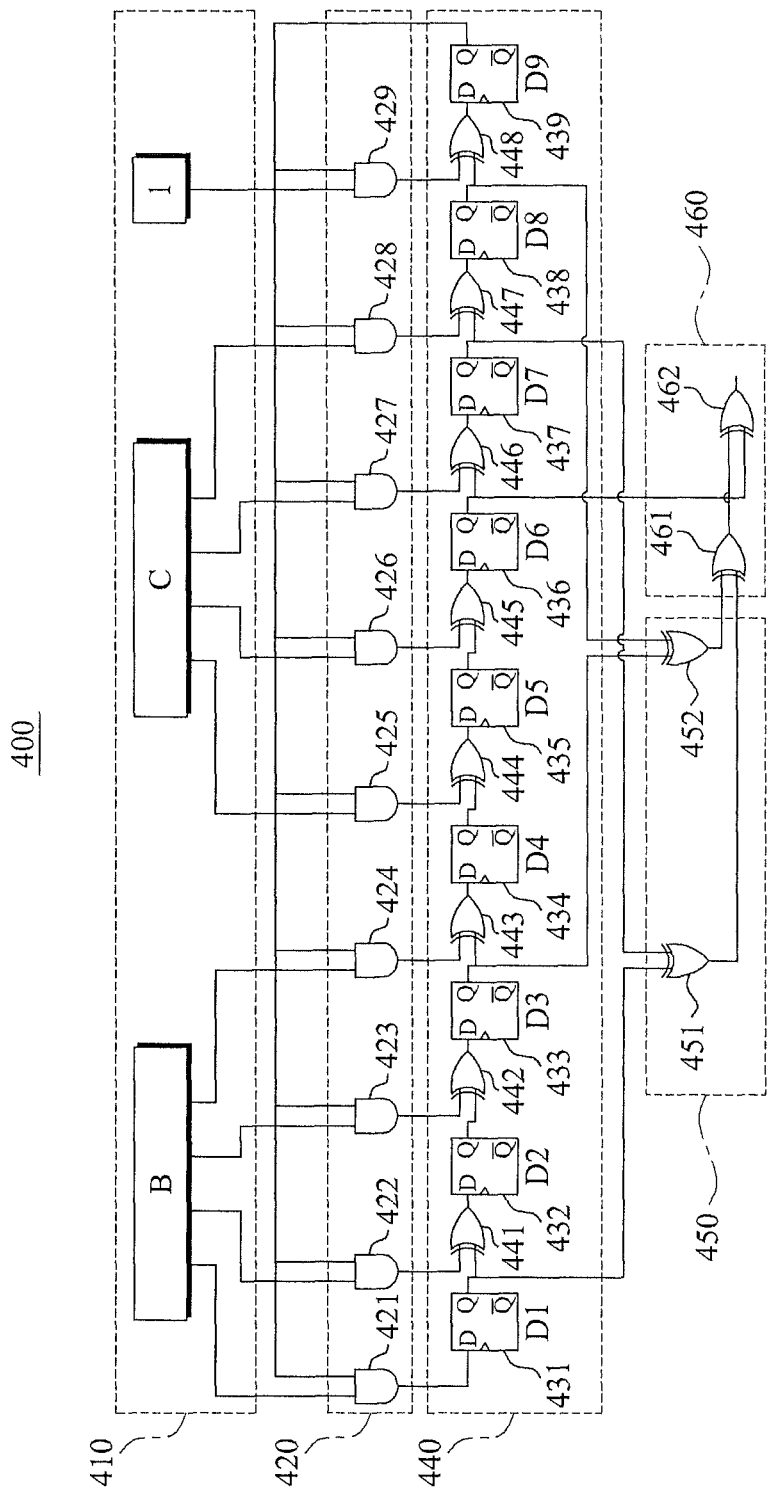
FIG. 4 illustrates a structure of a PN code generating apparatus according to an embodiment of the present invention.

FIG. 4 illustrates the structure of a PN code generating apparatus 400 according to an embodiment of the present invention.

The PN code generating apparatus 400 may include an initial storage unit 410, an adder unit 420, a bit shifter unit 440, a first XOR operation unit 450, and a second XOR operation unit 460. The adder unit 420 may include nine AND gates 421, 422, 423, 424, 425, 426, 427, 428, and 429. The bit shifter unit 440 may include nine D-flip flops (D1, D2, D3, D4, D5, D6, D7, D8, and D9) 431, 432, 433, 434, 435, 436, 437, 438, and 439, and eight XOR gates 441, 442, 443, 444, 445, 446, 447, and 448. The first XOR operation unit 450 may include two XOR gates 451 and 452. The second XOR operation unit 460 may include two XOR gates 461 and 462.

The XOR gate 451 may perform XOR operation for output values of the D-flip flops 441 and 447. The XOR gate 452 may perform XOR operation for output values of the D-flip flops 444 and 448. The XOR gate 461 may perform XOR operation for each of output values of the XOR gates 451 and 452. XOR operation may be performed for the output value of the XOR gate 461 and the output value of the D-flip flop 446 to thereby generate a single bit constituting the PN code.

Unlike the conventional PN code generating apparatus 300 shown in FIG. 3, the PN code generating apparatus 400 according to an aspect of the present invention may perform the XOR operation for output values of all the selected D-flip flops, using the first XOR operation unit 450 and the second XOR operation unit 460. Therefore, the PN code generating apparatus 400 may have the linear property and thereby may generate the PN code that can satisfy the run property, and the shift and add property.

Figure 5:
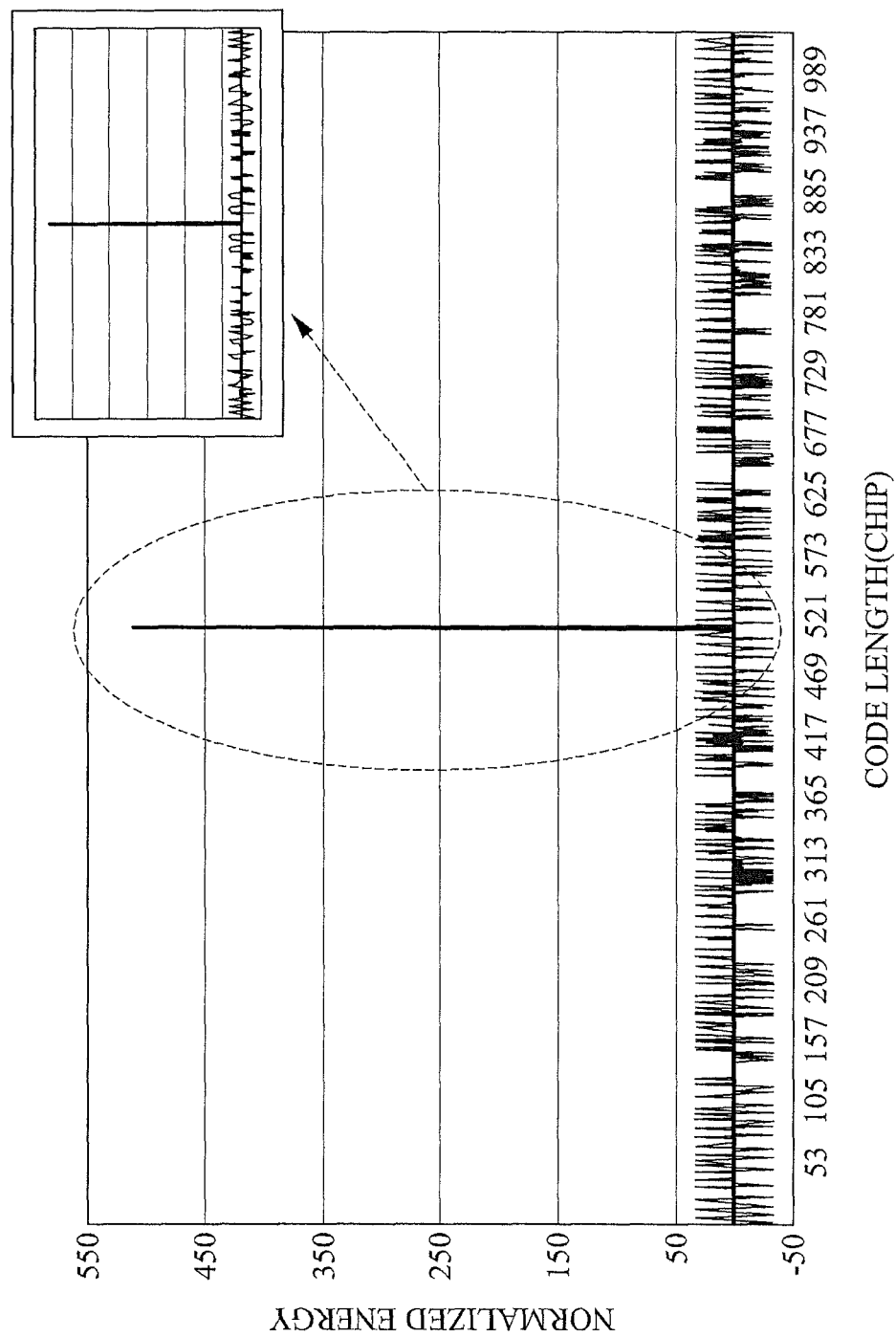
FIG. 5 is a graph illustrating an autocorrelation property of a PN code generated by the conventional PN code generating apparatus of FIG. 3.

FIG. 5 is a graph illustrating an autocorrelation property of a PN code generated by the conventional PN code generating apparatus of FIG. 3.

Here, the conventional PN code generating apparatus may correspond to the PN code generating apparatus 300 of FIG. 3. The length of the PN code generated by the conventional PN code generating apparatus was about 511 and a simulation test was performed by the code length.

When a small portion of the code matches, a correlation property value may exist. For the PN code with the excellent discrimination, the correlation property value may have a maximum value corresponding to the code length when the code exactly matches. In other cases, the correlation property value may have a value of −1. Specifically, when the code does not exactly match, correlation property value may have a poor correlation property value.

When using the PN code generated by the conventional PN code generating apparatus, it is possible to obtain the correlation property value of 511 corresponding to a maximum value at a point in time when the code matches. Even in other cases, a section with a particular correlation property value in between about −31 to about +31 may exist. Specifically, when the code does not exactly match, 31 code value matching sections may exist. When using the above PN code, an interference probability for another signal may increase. Therefore, it may be difficult to retrieve a desired signal and demodulated it.

Figure 6:
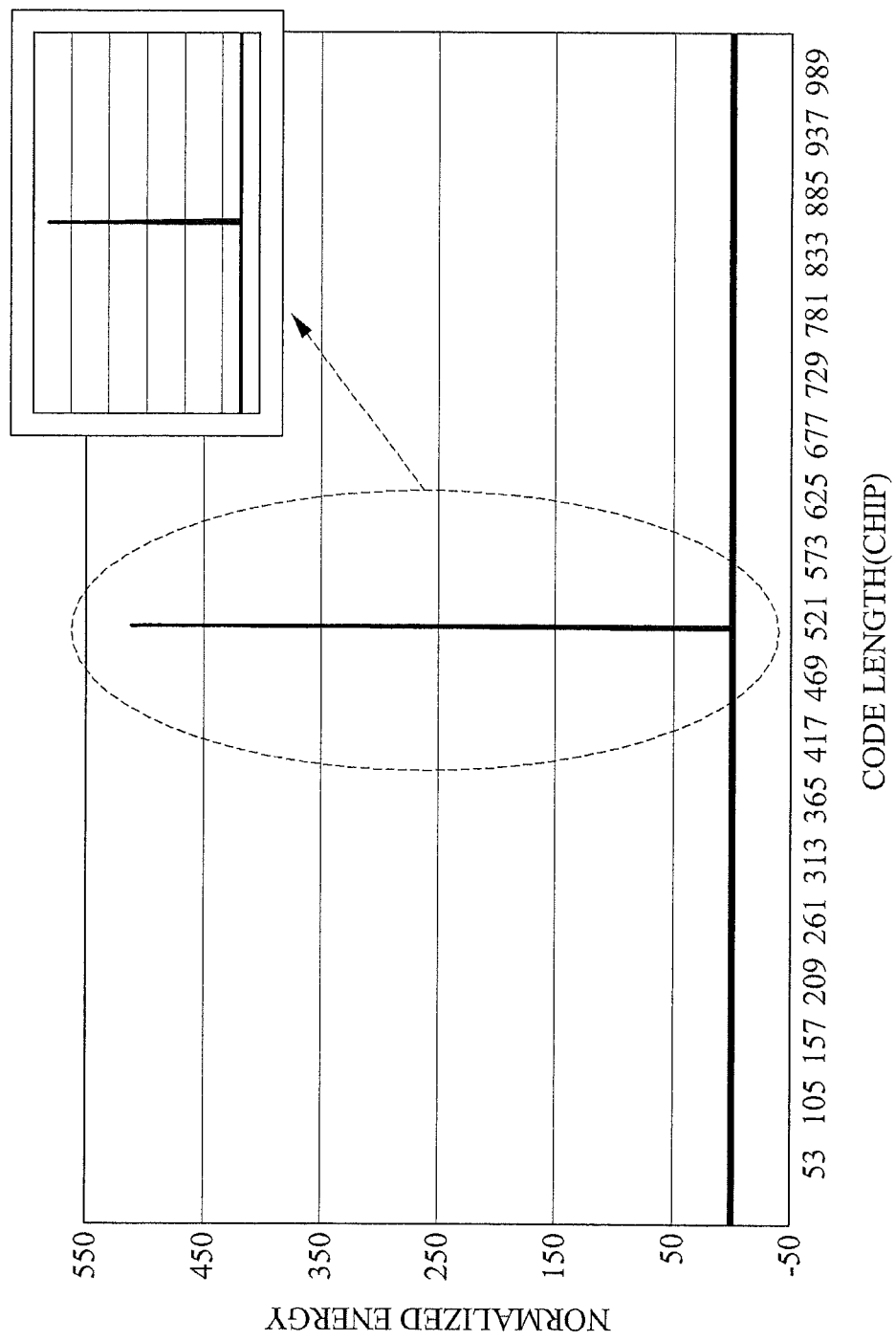
FIG. 6 is a graph illustrating an autocorrelation property of a PN code generated by a PN code generating apparatus according to an embodiment of the present invention.

FIG. 6 is a graph illustrating an autocorrelation property of a PN code generated by a PN code generating apparatus according to an embodiment of the present invention.

Here, the PN code generating apparatus according to the present embodiment may correspond to the PN code generating apparatus 400 shown in FIG. 4. As in FIG. 5, the length of the PN code generated by the PN code generating apparatus was about 511 and a simulation test was performed by the code length.

As shown in FIG. 6, when 511 codes exactly match, it is possible to obtain the correlation property value of 511 corresponding to a maximum value. When only a single code deviates, there is no matching code and thus the PN code may have a value of −1. Specifically, in comparison to the PN code generated by the conventional PN code generating apparatus, the PN code generated by the PN code generating apparatus according to the present embodiment may have an enhanced discrimination.

Figure 7:
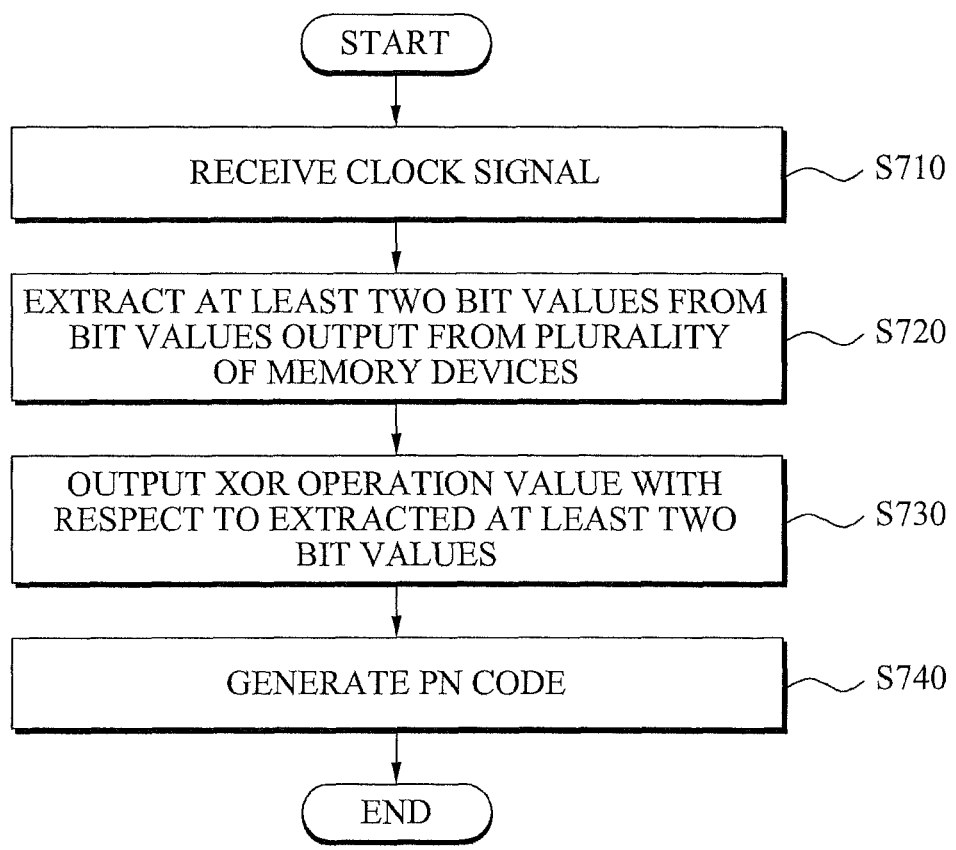
FIG. 7 is a flowchart illustrating a method of generating a PN code according to an embodiment of the present invention.

FIG. 7 is a flowchart illustrating a method of generating a PN code according to an embodiment of the present invention. Hereinafter, the method of generating the PN code will be described in detail with reference to FIG. 7.

In operation S710, the PN code generating method may receive a clock signal.

The clock signal may be used to generate the PN code and may also be a periodical clock signal.

In operation S720, the PN code generating method may extract at least two bit values from bit values output from a plurality of memory devices in correspondence to the clock signal.

The plurality of memory devices may receive a particular bit value and output the received particular bit value after a predetermined period of time is elapsed. According to an aspect of the present invention, the plurality of memory devices may be cascaded. In this instance, each of the plurality of memory devices may correspond to a memory device constituting a feedback shift register. Also, the memory device may correspond to a flip flop.

In operation S730, the PN code generating method may output an XOR operation value with respect to the extracted at least two bit values.

In operation S740, the PN code generating method may generate the PN code based on the output XOR operation value.

According to an aspect of the present invention, the clock signal received in operation S710 may be a periodical clock signal. The PN code generating method may generate the PN code by outputting the XOR operation value for each clock period based on the periodical clock signal in operation S730 and sequentially arranging the generated XOR operation value in operation S740. Specifically, in operation S740, the PN code generating apparatus may generate the PN code by sequentially arranging the XOR operation values that are output for each clock period.

According to an aspect of the present invention, the plurality of memory devices may be cascaded, and the PN code generating method may further include outputting an AND operation value with respect to a stored initial value of each of the memory devices and an output value of a memory device that is positioned in a final end among the plurality of cascaded memory devices. In this case, a memory device that is positioned in a front end among the plurality of cascaded memory devices may receive an AND operation value with respect to an initial value of the memory device of the front end. Each of memory devices excluding the memory device of the front end may receive an XOR operation value with respect to an AND operation value associated with an initial value of each of the memory devices and an output value of the memory device that is disposed in front of each corresponding memory device.

Embodiments of the present invention have been described above. The configuration of the PN code generating apparatus described above with reference to FIG. 2 may be applicable to the embodiments as is. Further detailed descriptions will be omitted here.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for generating a pseudo noise (PN) code, the apparatus comprising:
    a memory device unit including a plurality of memory devices;
    an exclusive-OR (XOR) operation unit receiving output values of at least two memory devices among output values of the plurality of memory devices to output an XOR operation value with respect to the received output values; and
    a PN code generation unit generating the PN code based on an output value of the XOR operation unit,
    wherein:
    the plurality of memory devices is cascaded, and
    the apparatus further comprises:
    an initial value storage unit storing an initial value of each of the memory devices; and
    an AND operation unit outputting an AND operation value with respect to the initial value of each of the memory devices and an output value of a memory device that is positioned in a final end among the plurality of cascaded memory devices, and
    a memory device that is positioned in a front end among the plurality of cascaded memory devices receives an output value of the AND operation unit with respect to the initial value of the memory device of the front end.

2. The apparatus of claim 1, wherein each of memory devices excluding the memory device of the front end receives an XOR operation value with respect to an output value of the AND operation unit associated with the initial value of each of the memory devices and an output value of a memory device that is positioned in front of each corresponding memory device.

3. A method of generating a PN code, the method comprising:
    receiving a clock signal;
    extracting at least two bit values from bit values that are output from a plurality of memory devices in correspondence to the clock signal;
    outputting an XOR operation value with respect to the extracted at least two bit values; and
    generating the PN code based on the output XOR operation value,
    wherein:
    the plurality of memory devices is cascaded, and
    the method further comprises:
    outputting an AND operation value with respect to a stored initial value of each of the memory devices and an output value of a memory device that is positioned in a final end among the plurality of cascaded memory devices, and
    a memory device that is positioned in a front end among the plurality of cascaded memory devices receives an AND operation value with respect to an initial value of the memory device of the front end, and
    each of memory devices excluding the memory device of the front end receives an XOR operation value with respect to an AND operation value associated with an initial value of each of the memory devices and an output value of the memory device that is disposed in front of each corresponding memory device.

* * * * *